United States Patent
Samorodov et al.

[11] 4,016,485
[45] Apr. 5, 1977

[54] ARRANGEMENT FOR LIMITING DYNAMIC OVERVOLTAGES

[76] Inventors: German Ivanovich Samorodov, prospekt Dzerzhinskogo, 30/4, kv. 6; Evgeny Nikolaevich Loiko, ulitsa Relsovaya, 21, kv. 65, both of Novosibirsk, U.S.S.R.; Orest Viktorovich Olshevsky, deceased, late of Novosibirsk, U.S.S.R.; by Valentina Mikhailovna Olshevskaya, administrator; by Alexandr Orestovich Olshevsky, administrator, both of ulitsa Meschanskaya 1, kv. 26, Moscow, U.S.S.R.; by Viktor Alexandrovich Olshevsky, administrator; by Nina Alexandrovna Olshevskaya, administrator, both of ulitsa

[22] Filed: Mar. 2, 1976

[21] Appl. No.: 663,083

[52] U.S. Cl. ............................. 323/101; 323/124; 323/127; 323/128
[51] Int. Cl.[2] ............................................ G05F 1/68
[58] Field of Search .......... 323/106, 105, 101, 122, 323/124, 127, 128; 333/80 R, 84 R; 317/31, 14 B

[56] References Cited
UNITED STATES PATENTS

| | | | |
|---|---|---|---|
| 3,424,971 | 1/1969 | Stackegard | 323/128 |
| 3,754,184 | 8/1973 | Stone | 323/128 |
| 3,829,736 | 8/1974 | Schirman | 323/128 |

Primary Examiner—Gerald Goldberg
Attorney, Agent, or Firm—Fleit & Jacobson

[57] ABSTRACT

According to the invention, the arrangement for limiting dynamic overvoltages in a long-distance power transmission line for commercial-frequency current, interconnecting a transmitting power system and a receiving power system, includes batteries of static capacitors and switching devices connecting these batteries of static capacitors to the power transmission line the moment relative swinging of the power systems occurs, at points spaced, respectively, from the transmitting power system and from the receiving one by a distance of which the wavelength equals one half of the wavelength of the commercial-frequency voltage. The disclosed arrangement enables to limit the dynamic overvoltages without affecting the level of the dynamic stability of the interconnected power systems.

1 Claim, 2 Drawing Figures

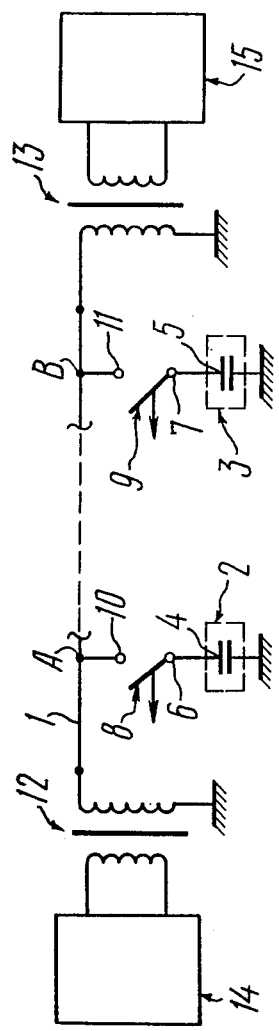
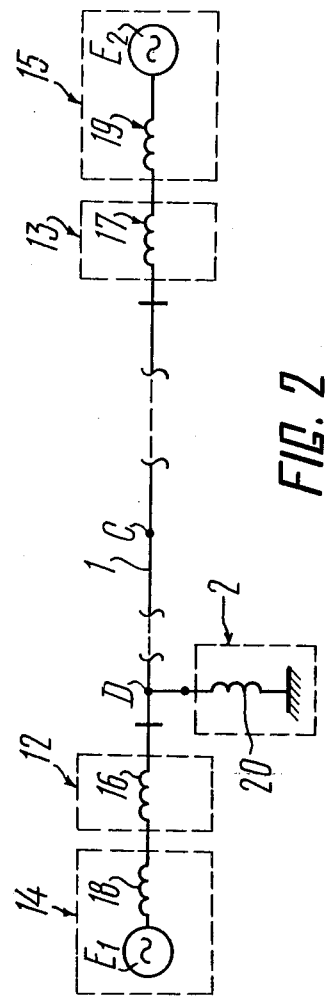
FIG. 1
FIG. 2

ARRANGEMENT FOR LIMITING DYNAMIC OVERVOLTAGES

The present invention relates to protection circuitry for power transmission lines, and, more particularly, it relates to arrangements for limiting dynamic overvoltages.

The invention can be utilized with every possible circuitry of a tuned power transmission, i.e. with block-wise or sectionalized, with semiblock-wise or semisectionalized and with interleaved versions.

The problem of transmitting electricity over long distances, which is present nowadays, can be solved by creating long-distance power transmission lines for either three-phase alternating current or direct current. In cases where the wavelength of an alternating-current line is short of 60 electric degrees, which amounts to approximately 1000 km for a 50 Hz frequency of the alternating current, there are usually employed either plain or compensated alternating-current transmission lines. A power transmission line of a wavelength equalling 180 electric degrees (3000 km at 50 Hz) is called a half-wave line, its operating mode being called the half-wave one. Within the wavelength range of transmission lines from 120 to 240 electric degrees (2000 km to 4000 km at the 50 Hz frequency) it has been found expedient to operate such transmission lines in the half-wave mode.

A power transmission line having the wavelength different from 180 electric degrees is to be tuned by means of specially provided arrangements to ensure a sufficient level of electromechanical and electromagnetic stability, so that the wavelength thereof should amount to 180 electric degrees. Power transmission lines of this kind are usually referred to as "tuned lines". Therefore, in the disclosure to follow the expression "tuned power transmission lines" will be applied to transmission lines having their own wavelength within the range from 120 to 240 electric degrees and tuned to the half-wave mode of operation by means of specific arrangements.

Owing to their great own length and to the appearance of resonance phenomena, tuned power transmission lines have become a specific type of transmission lines capable of developing increased voltages in the central part of the line on account of oscillation or swinging of the rotors of the generators of the receiving and transmitting power systems, i.e. to swinging of the power systems. Thus, the expression swinging of the power systems is herein used to denote the process of relative oscillation of the rotors of the receiving and transmitting systems, caused by disturbances in the normal operation of the power systems, e.g. short-circuiting, load drops, etc. The increased voltages in the central part of a power transmission line, which have been named dynamic overvoltages, are capable of exceeding considerably the permissible level of overvoltages. Besides, such overvoltages exert their action within prolonged periods upon the insulation of the transmission line in question, since the time of their action is determined by the swing period of the rotors of the generators of the connected power systems. Such prolonged action of dynamic overvoltages might cause failure of the line insulation and might lead to development of emergency situation in the connected systems and to the necessity of cutting out the tuned transmission system for long periods. Therefore, the dynamic overvoltages must be limited to a permissible level.

A known arrangement for limiting dynamic overvoltages in a power transmission line (see "Tuned Power Transmissions" Manual edited by Tscherbakov V.K., the publishing house of the Siberian Division of the USSR Academy of Sciences, Novosibirsk, 1963) includes a series connection of a high-capacity discharger and a resistor. Such arrangements are connected to a power transmission line at spaced points throughout its length. The dischargers react and operate upon the voltage attaining a value approaching that of the permissible level, connecting the resistors to the transmission line, which results in the voltage being reduced in the point of the connection of the discharger to the transmission line.

Another known arrangement for limiting dynamic overvoltages (see the same manual "Tuned Power Transmissions" edited by V.K. Tscherbakov, the publishing house of the Siberian Division of the USSR Academy of Sciences, Novosibirsk, 1963) includes batteries or stacks of static capacitors and switching devices connecting these batteries of static capacitors to the power transmission line the moment a relative swing of the connected power system occurs. This connection results in the resistance of the transmission line increasing and in the voltage in the central part of the line diminishing.

A disadvantage of the known arrangements for limiting dynamic overvoltages is their negative influence on the dynamic stability of the connected power systems.

It is an object of the present invention to create an arrangement for limiting dynamic overvoltages, which should provide for reducing dynamic overloads, while maintaining the required level of the dynamic stability of the connected power system.

The essence of the invention resides in that in an arrangement for limiting dynamic overloads in a long-distance power transmission line, interconnecting a transmitting power system and a receiving power system and comprising batteries of static capacitors and switching devices adapted to connect these batteries of static capacitors to the power transmission line the moment a relative swing of the connected power systems occurs, the input of each switching device being connected to the output of the respective battery of static capacitors, the outputs of the switching devices being connected to the transmission line, in accordance with the present invention, one of the batteries of static capacitors is connected via the respective switching device to the transmission line at a point spaced from the transmitting power system by a distance of which the wavelength is equal to half the wavelength of the commercial frequency voltage, while another battery of static capacitors is connected to the transmission line at a point spaced from the receiving power system by a distance equal to half the wavelength of the commercial frequency voltage.

The arrangement for limiting dynamic overvoltages, constructed in accordance with the invention, provides for limiting dynamic overvoltages in a long-distance power transmission line, without affecting the dynamic stability of the interconnected power systems.

The present invention will be further described in connection with an embodiment thereof, with reference being had to the accompanying drawings, wherein:

FIG. 1 is the circuit diagram of an arrangement for limiting dynamic overvoltages in a long-distance power transmission line, according to the invention;

FIG. 2 illustrates an equivalent circuit simulating the power transmission system according to the invention.

Referring now to the appended drawings, the arrangement for limiting dynamic overvoltages in a long-distance transmission line 1 (FIG. 1) includes two batteries 2 and 3 of static capacitors or reactors, of which the respective outputs 4 and 5 are connected to the inputs 6 and 7 of switching devices 8 and 9. The outputs 10 and 11, respectively, of the switching devices 8 and 9 are connected at points A and B to the power transmission line 1 interconnecting through the transformers 12 and 13 a transmitting power system 14 and a receiving power system 15. The point A is spaced from the receiving power system 15 by a distance of which the wavelength equals half the wavelength of the voltage of the industrial or commercial frequency. The point B is likewise spaced from the transmitting power system 14 by a distance of which the wavelength is half the wavelength of the commercial frequency voltage.

The above specified positioning of the points A and B of connection of the switching devices 8 and 9 to the power transmission line 1 is derived from the following theoretical calculations.

By presenting the equations of the transmission line 1 as those of a four-terminal network, it is possible to determine the value of the voltage modulus at any point of the line 1 (FIG. 2) through the parameters of the equivalent four-terminal networks and electromotive forces (EMF) $E_1$ and $E_2$ of the receiving power system 15 and transmitting power system 14 from the following formula:

$$\mu_x = 1/B_{eq12} \left[ (E_1 B_{x2})^2 + (E_2 B_{1x})^2 + 2E_1 E_2 B_{1x} B_{x2} \cdot \cos(\delta_0 + \Delta\delta) \right]^{1/2} \quad (1)$$

where $B_{eq12}$ is the factor of the equivalent four-terminal network simulating the entire power transmission system including the transmission line 1, the reactances 16 and 17 of the transformers 12 and 13 and the reactances 18 and 19 of the transmitting and receiving power systems 14 and 15;

$x$ is the reference coordinate position of a point, expressed as a distance from the transmitting system 14;

$B_{1x}$ is the factor of the equivalent four-terminal network simulating the part of the transmission line 1 from the transmitting system 14 to the point x, the reactance 16 of the transformer 12 and the reactance 18 of the transmitting system 14;

$B_{x2}$ is the factor of the equivalent four-terminal network simulating the part of the transmission line 1 from the point x to the receiving power system 15, the reactance 17 of the transformer 13 and the reactance 19 of the receiving power system 15;

$E_1$ and $E_2$ are the moduli of the equivalent EMF values of the transmitting power system 14 and the receiving one 15;

$\delta_0$ is the angle between the vectors $E_1$ and $E_2$;

$\Delta\delta$ are the increments of the angle $\delta_0$ during oscillation or swinging of the power systems 14 and 15.

Now, let us define a point within the transmission line 1, wherein the developed dynamic overvoltages are at the maximum, as the electric centre C, and also let us determine the value of the overvoltage by substituting this fixed reference C for a current reference coordinate x:

$$\mu_{max} = 1/B_{eq12} \left[ (E_1 B_{C2})^2 + (E_2 B_{1C})^2 + 2E_1 E_2 B_{1C} B_{C2} \cdot \cos(\delta_0 + \Delta\delta) \right]^{1/2} \quad (2)$$

where $B_{1C}$ is the factor of the equivalent four-terminal network simulating the part of the transmission line 1 from the transmitting power system 14 to the point C, the reactance 16 of the transformer 12 and the reactance 18 of the transmitting power system 14;

$B_{C2}$ is the factor of the equivalent four-terminal network simulating the part of the transmission line 1 from the point C to the receiving power system 15, the reactance 19 of the receiving power system 15 and the reactance 17 of the transformer 13.

An analysis of the expression (2) shows that the maximum value of the overvoltage can be reduced by increasing the factor $B_{eq12}$ of the entire power transmission system, by decreasing the oscillation or swinging of the transmitting power system 14 and of the receiving power system 15, i.e. by decreasing $\Delta\delta$, and also by decreasing the factors $B_{1C}$ and $B_{C2}$.

If a capacity susceptance 20 equivalent to the battery 2 of static capacitors is connected at some point D to the transmission line 1, intermediate the transmitting power system 14 and the electric centre C of the line 1, then:

$$B_{1DC} = B_{1C} - b \cdot B_{1D} \cdot B_{DC} \quad (3)$$

where $B_{1DC}$ is the factor of the equivalent four-terminal network simulating the part of the power transmission line 1 from the transmitting power system 14 to the point C, the reactance 16 of the transformer 12, the reactance 18 of the transmitting power system 14 and the capacity susceptance 20 of the battery 2 of static capacitors;

$b$ is the capacity susceptance value of the capacity susceptance 20;

$B_{1D}$ is the factor of the equivalent four-terminal network simulating the part of the power transmission line 1 from the transmitting power system 14 to the point D, the reactance 16 of the transformer 12 and the reactance 18 of the transmitting power system 14;

$B_{DC}$ is the factor of the equivalent four-terminal network simulating the part of the transmission line 1 between the points D and C.

As it can be seen from the expression (3), the factor $B_{1DC}$ is bound to decrease with the battery 2 of static capacitors being connected in parallel with the transmission line 1.

For the entire power transmission system, with the battery 2 of static capacitors being connected at the point D:

$$B_{eq1D2} = B_{eq12} - b \cdot B_{1D} \cdot B_{D2} \quad (4)$$

where $B_{eq1D2}$ is the factor of the equivalent four-terminal network simulating the entire power transmission system, including the power transmission line 1, the reactances 16 and 17 of the transformers 12 and 13, the reactances 18 and 19 of the transmitting power system 14 and of the receiving one 15 and the capacity susceptance 20 of the battery 2 of static capacitors;

$B_{D2}$ is the factor of the equivalent four-terminal network simulating the part of the transmission line 1 from the point D to the receiving power system 15, the reactance 17 of the transformer 14 and the reactance 19 of the receiving system 15.

It can be reduced from the expression (4) that if the battery 2 of static capacitors is connected at such a point A (FIG. 1) whereat the factor $B_{D2}$ is defined by the part of the power transmission line 1, having the wavelength equalling one half of the wavelength of the voltage, the factor $B_{D2}$ equals zero, and the connected battery 2 of static capacitors would not affect the factor $B_{eq1D2}$.

This means that the fact of connection of the battery 2 of static capacitors does not affect the level of the dynamic stability of the interconnected power systems 14 and 15.

A calculation similar to the one described hereinabove can be performed in the case of the point B wherein the battery 3 of static capacitors is connected to the power transmission line 1.

The wavelength of the power transmission line 1 being short of the wavelength of the industrial or commercial frequency, as it has been stated above, it can be seen that there are only two such points within the transmission line 1, viz. the very points A and B.

At a normal operational duty of the power transmission system the switching devices 8 and 9 are off.

The arrangement for limiting dynamic overvoltages starts acting the moment there are developed within the transmission line 1 dynamic overvoltages above the permissible level. At such a moment a command is sent to the switching devices 8 and 9 from an automatic system monitoring dynamic overvoltages (not shown in the drawings), whereby the switching devices 8 and 9 operate and connect the batteries 2 and 3 of static capacitors to the transmission line 1. The period of connection of the batteries 2 and 3 of static capacitors to the power transmission line 1 depends on the time within which the dynamic overvoltages exist in the line. When the dynamic overvoltages are subdued, the automatic system monitoring the dynamic overvoltages sends a signal for the switching devices 8 and 9 to break and to disconnect the batteries 2 and 3 of static capacitors from the power transmission line 1.

Therefore, if a power transmission system possesses sufficient reserves of dynamic stability, it is possible to curb the dynamic overvoltages in the system by parallel connection of the batteries 2 and 3 of static capacitors at the respective points A and B spaced from the transmitting power system 14 and the receiving one 15 by distances of which the wavelength equals one half of the wavelength of the voltage, the reserves of the dynamic stability of the power systems being unaffected by such connection.

What is claimed is:

1. An arrangement for limiting dynamic overvoltages in a long-distance power transmission line of commerical frequency, interconnecting a transmitting power system and a receiving power system, comprising:
    a. two batteries of static capacitors; the outputs respectively, of said batteries of static capacitors;
    b. two switching devices adapted to connect, respectively, said two batteries of static capacitors to said long-distance commercial-frequency power transmission line the moment relative swinging of said transmitting power system and said receiving power system occurs;
    c. the input of one of said two switching devices being connected to said output of one of said batteries of static capacitors;
    d. the input of the other one of said two switching devices being connected to the output of the other one of said two batteries of static capacitors;
    e. the output of said other switching device being connected to said long-distance commercial-frequency power transmission line at a point spaced from said transmitting power system by a distance of which the wavelength equals half the wavelength of the voltage of this commercial frequency;
    f. the output of said one switching device being connected to said long-distance commercial-frequency power transmission line at a point spaced from said receiving power system by a distance of which the wavelength equals half the wavelength of the voltage of this commercial frequency.

* * * * *